July 1, 1958  R. N. KIRCHER  2,841,050
STRIP CUPS
Filed July 30, 1956

INVENTOR
RALPH N. KIRCHER

By John W. Michael
ATTORNEY

United States Patent Office 2,841,050
Patented July 1, 1958

2,841,050
STRIP CUPS

Ralph N. Kircher, West Bend, Wis., assignor to West Bend Aluminum Co., West Bend, Wis., a corporation of Wisconsin Application July 30, 1956, Serial No. 600,892

4 Claims. (Cl. 88—14)

This invention relates to an improvement in strip cups. Strip cups are used to examine milk for mastitis symptoms and to detect any abnormal conditions of the milk.

One object of this invention is to provide a strip cup for such purpose which permits mastitis symptoms, flaky or abnormal milk to be easily detected.

Another object of this invention is to provide a strip cup which permits quick removal of the milk which is being tested.

A further object of this invention is to provide a strip cup which is sanitary, easy to clean, will not clog, and is light yet capable of withstanding hard usage.

To obtain these objects a solid metal inset or pan with sloping bottom and large drain slot at the upper end of such bottom is removably fitted within the open top of a base container or cup. Both the pan and cup are made of extra hard stain resistant electrofinish aluminum. The pan may have a black finish. The smooth and unobstructed surfaces without screens and sharp angles or projections permit all parts to be readily cleaned and thus kept sanitary. In testing, the milk is first directed onto the sloping bottom of the pan where it collects in a reservoir at the deep part of the pan. The entire cup is then tilted and the milk or other fluid will flow over the bottom of the inset pan to the drain slot. As the milk flows over the bottom it is easily inspected for the symptoms of mastitis, or watery, flaky or other abnormal milk conditions. The large drain slot permits quick removal of the milk during such testing operation into the base cup which provides enough space for inspected specimens.

Figure 1:
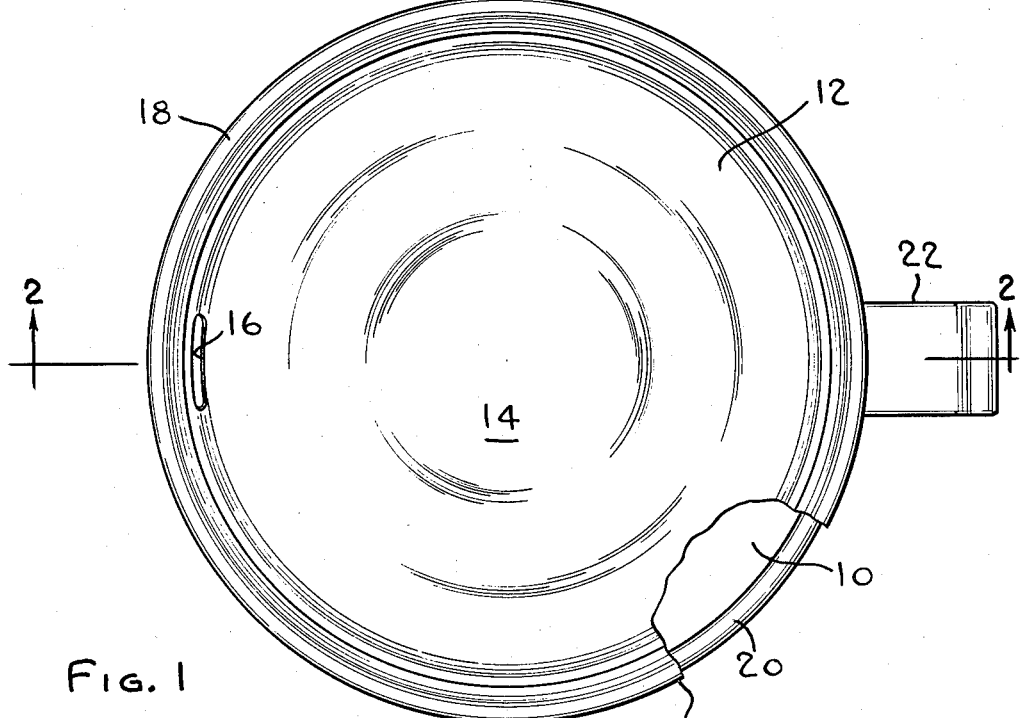
Fig. 1 is a top plan view of a strip cup embodying the present invention.
Figure 2:
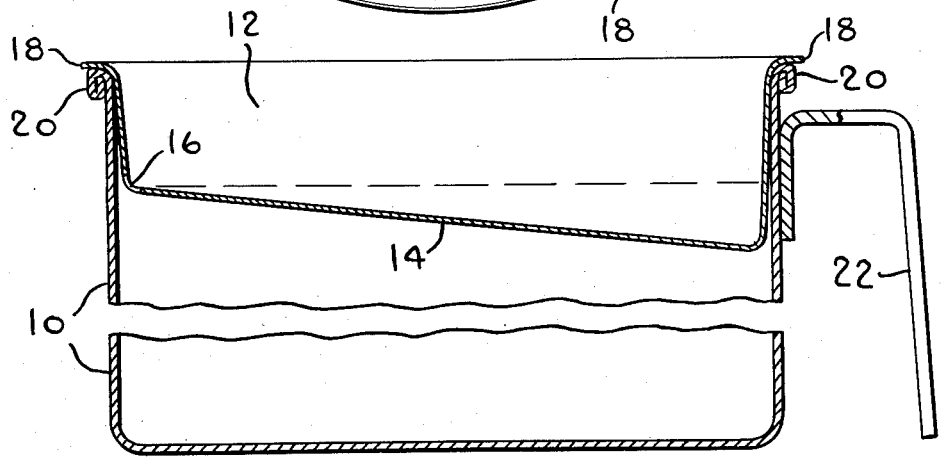
Fig. 2 is a sectional view taken on the line 2—2 of Fig. 1.

The strip cup shown in the drawing and constituting one embodiment of the invention comprises a base container or cup 10 in the open top of which is inserted and held an inset or pan 12. The pan 12 has a sloping bottom 14. At the juncture of the upper edge of the sloping bottom and a side of the pan 12 there is placed a large drain slot 16. Thus the pan forms a temporary reservoir at the deep part thereof. The pan 12 is provided with an upper peripheral flange 18 which rests against the upper edge of the cap 10 to hold the pan 12 in place. The cup 10 and pan 12 both have smooth inside surfaces unencumbered by projections, grooves or the like, thus making them easy to clean and keep sanitary. The drain slot 16 is large enough to permit the quick removal of the milk from the reservoir part of the pan during inspection. The freedom from screens and small holes eliminates any possible clogging and further assists in keeping the strip cup in sanitary condition.

The cup 10 is made of natural electrofinish aluminum which provides an extra hard, stain resistant surface throughout. Its upper edge may be provided with a bead such as the flat bead 20 illustrated. A simple handle 22 is spot welded to the cup 10. This cup is light, rustproof, free of hard to clean rivets, and other contamination collecting areas and yet is strong and able to withstand hard usage.

The pan 12 in this embodiment is made of black electrofinish aluminum which aids in the visual inspection of the milk. It is preferable that its sides slope slightly inwardly and downwardly to make the insertion of the pan into the cup easy.

To use the strip cup in testing for mastitis symptoms, or flaky, or abnormal milk, the pan 12 is seated in the upper part of the cup 10. The strip cup is held by the handle 22 and a substantial amount of test fluid is introduced into the pan 12 so that it flows down the sloping bottom and collects in the reservoir area at the deep end. The strip cup is then tilted toward the drain slot 16 so that the fluid flows over the black surface of the bottom 14. During such time the milk is analyzed visually for the possible contamination. The milk so inspected will continue to freely flow out of the drain slot 16 and into the cup 10. Such cup after successive uses may be emptied. In the recommended procedure all the milk from one teat of the udder is first drained from the pan 12 into the cup 10 before the milk from another quarter or teat is introduced into the pan 12.

I claim:

1. A strip cup comprising a cup having an open top and a pan removably positioned in said cup, said pan having a sloping bottom with a drain slot at an upper level of said sloping bottom.

2. A strip cup as claimed in claim 1 in which said cup is made of natural electrofinish aluminum and said pan is made of black electrofinish aluminum.

3. A strip cup as claimed in claim 2 in which said pan has a flange at the upper end thereof, seating on the upper end of said cup to hold said pan in said cup with said bottom below said open top.

4. A strip cup comprising a cup having a smooth surface interior, a handle spot welded to the outside of said cup, a pan fitting within said cup and suspended from the top thereof, said pan having a solid sloping bottom, and a large drain slot at the highest part of said bottom.

References Cited in the file of this patent

UNITED STATES PATENTS

| | | |
|---|---|---|
| 2,467,949 | Thomas | Apr. 19, 1949 |
| 2,518,831 | Stallock et al. | Aug. 15, 1950 |

FOREIGN PATENTS

| | | |
|---|---|---|
| 497,126 | Great Britain | Dec. 13, 1938 |